No. 762,109. PATENTED JUNE 7, 1904.
W. J. WRIGHT.
REVERSING CLUTCH MECHANISM.
APPLICATION FILED MAR. 23, 1903. RENEWED FEB. 24, 1904.
NO MODEL.
2 SHEETS—SHEET 1.
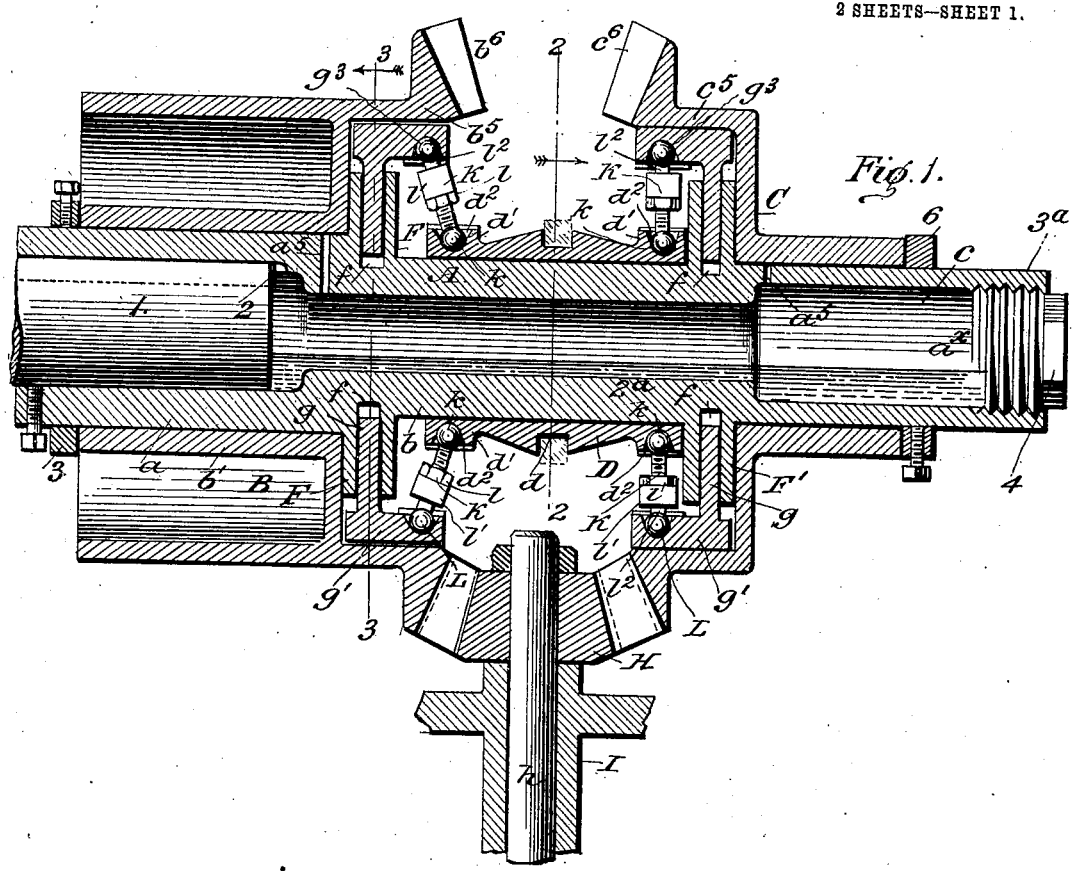
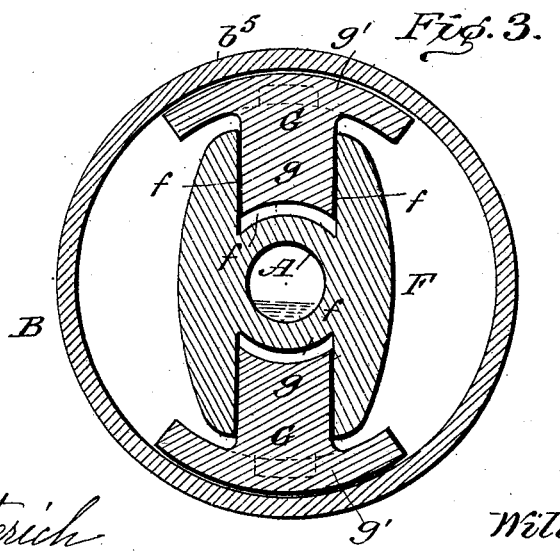
WITNESSES:
Louis Dieterich
John T. Schrott
INVENTOR
William J. Wright
BY
Fred G. Dieterich & Co.
Attorneys No. 762,109. PATENTED JUNE 7, 1904.
W. J. WRIGHT.
REVERSING CLUTCH MECHANISM.
APPLICATION FILED MAR. 23, 1903. RENEWED FEB. 24, 1904.
NO MODEL. 2 SHEETS—SHEET 2.
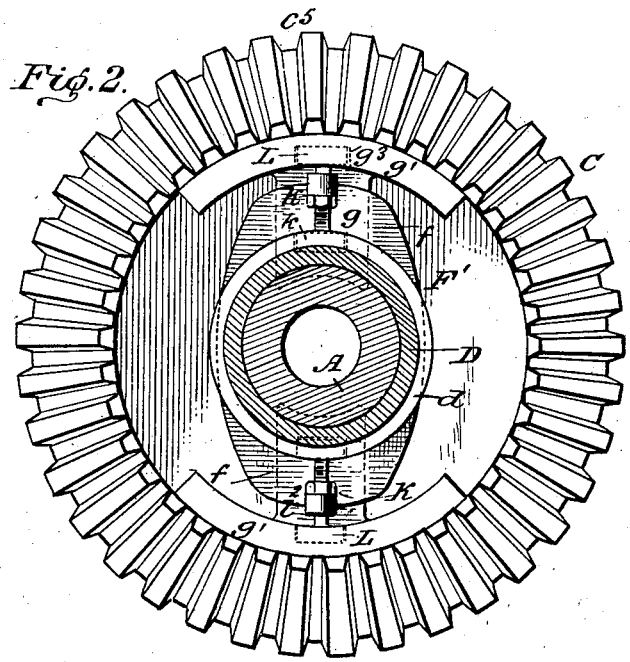
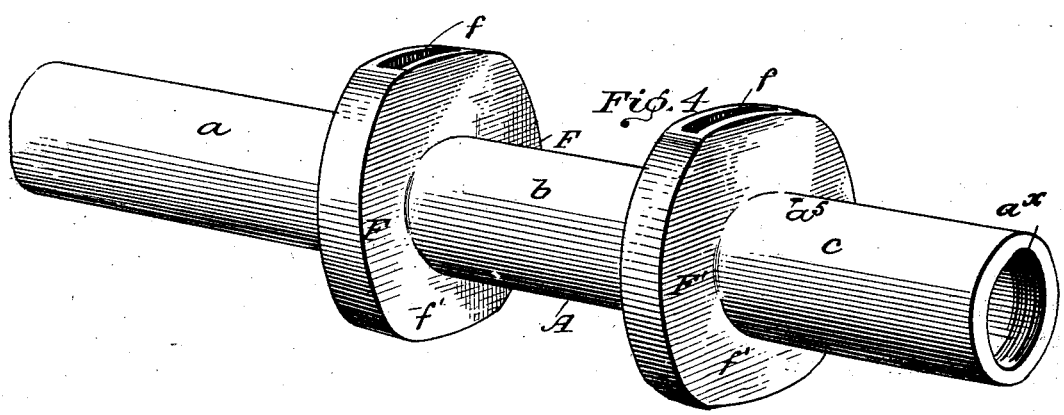
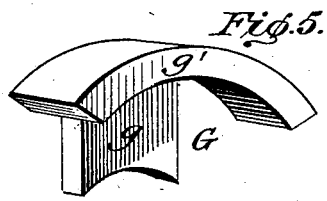
WITNESSES:
Louis Dieterich
John T. Schrott
INVENTOR
William J. Wright
BY
Fred G. Dieterich
Attorneys No. 762,109. Patented June 7, 1904.

UNITED STATES PATENT OFFICE.

WILLIAM JAMES WRIGHT, OF PITTSBURG, PENNSYLVANIA, ASSIGNOR, BY DIRECT AND MESNE ASSIGNMENTS, TO THE WRIGHT REVERSE COMPANY, OF PITTSBURG, PENNSYLVANIA, A CORPORATION OF WEST VIRGINIA.

REVERSING CLUTCH MECHANISM.

SPECIFICATION forming part of Letters Patent No. 762,109, dated June 7, 1904.

Application filed March 23, 1903. Renewed February 24, 1904. Serial No. 195,112. (No model.)

*To all whom it may concern:*

Be it known that I, WILLIAM JAMES WRIGHT, residing at Pittsburg, in the county of Allegheny and State of Pennsylvania, have invented a new and Improved Reversing Clutch Mechanism, of which the following is a specification.

My present invention is in the nature of an improved reversing clutch mechanism adapted to be coupled with a drive-shaft of an explosive or other engine for changing the direction of movement of the belt or driving-gear actuated by the drive power-shaft and which embodies the elements of economy and simplicity of construction, effectiveness and durability, ease of manipulation, and general efficiency; and in its generic arrangement it comprehends a special construction of tubular sleeve designed to be coupled to and form an extension of the drive-shaft to sustain the clutch devices and the belt-pulley or drive-gears that constitute a coöperative part of the said devices.

In its more complete nature my invention includes a sleeve or tubular shaft extension having integral pockets or boxes so combined with the body thereof whereby the complete sleeve with the pockets which are apertured to receive the friction-block shoes can be conveniently cast together and finished up with a minimum amount of hand labor; and in its still more subordinate features my invention consists in certain details of construction and peculiar combination of parts, all of which will hereinafter be fully explained, and specifically pointed out in the appended claims, reference being had to the accompanying drawings, in which—

Figure 1 is a longitudinal section of my improved construction of reversing clutch mechanism. Fig. 2 is a transverse section thereof on the line 2 2 of Fig. 1. Fig. 3 is a similar view taken on the line 3 3 of Fig. 1. Fig. 4 is a detail perspective view of the sleeve or tubular shaft extension, and Fig. 5 is a similar view of one of the friction or clutch shoes hereinafter referred to.

In the practical arrangement of my invention I employ a sleeve A, one end of which is cored out to receive the end of the engine or power shaft 1, and to which the said sleeve A is made fast by the key 2, as shown. The member A forms, as it were, a tubular extension for the shaft and is of sufficient length to substantially sustain all of the clutch or reversing devices and the outer extremity thereof, and the entire clutch mechanism and the sleeve may be supported from the shaft 1 and require no further bearing other than that afforded by the intermediate drive-gear, presently referred to, when it is disposed in a perpendicular plane, as shown.

In my present arrangement of clutch mechanism the sleeve or shaft extension A comprises substantially three independent bearing portions, (designated $a\ b\ c$,) the surface portion $a$ fitting nearly its full length on the shaft 1, whereby to provide a frame-support and connection with the shaft, and the said portion $a$ is designed to receive the combined belt-gear and clutch-pulley B, which has a hub $b'$ nearly the length of the sleeve part $a$ to provide a long bearing for the pulley B, and the latter, which is loosely mounted on the sleeve A, is held from lateral motion by a collar 3 at one end, which is fixedly clamped to the sleeve A, and a set of radially-projected clutch-shoe-holding pockets, the peculiar construction of which and their coöperative construction combined with the sleeve and the clutch-flanges on the reversing-gears forming an essential part of my invention.

The outer portion $c$ of the sleeve A is designed to support the clutch-gear C, and its extremity $3^a$ is sufficiently projected to form a lubricant-receiving chamber, while the part $c$ between the opposite sets of the radial shoe-pockets receives the slidable clutch-sleeve D, presently again referred to, and as the mechanism turns on the sleeve at the point between the opposing gears B and C the said sleeve portion $b$ is thickened, as indicated by $2^a$.

That portion of the sleeve A beyond the shaft 1 forms a convenient lubricant-holder fed from the outer open end $a^x$, which end after filling is closed by a plug-block 4, as shown, and by reason of the several apertures $a^5$ $a^5$ in the sleeve A the oil is caused to flow freely to the outer face of the sleeve and maintain an efficient lubrication of all the bearing parts.

When a bearing X is provided for the outer end of the sleeve $a$, as shown in dotted lines in Fig. 1, the said bearing forms a stop for preventing outward lateral thrust of the gear C, inward lateral thrust of which is prevented by reason of the said gear engaging with its adjacent brake-shoe box, that forms an integral part of the sleeve A; but when the bearing $x$ is not used a clamp-ring 6 is made fast to the sleeve, as shown in full lines in Fig. 1.

The sleeve or shaft extension A at the ends of its central portion $b$ is cast or otherwise formed with integral lateral enlargements F F', which are cored at their diametrically opposite ends to form pockets $f$ $f$, projected radially with respect to the axis of the sleeve, and the said portions have parallel side walls $f'$ $f'$ of suitable thickness (see Fig. 4) to properly guide the radially-disposed shanks of the clutch-shoes G, one of which is shown in detail in Fig. 5, by reference to which and to Fig. 1 it will be noticed the outer ends of the shanks $g$ merge with the segmental shoe portions $g'$ $g'$, whose gripping-faces are in a plane concentric with the inner or shoe-engaged flanges $b^5$ of the combined drive pulley and gear B and a similar flange $g^5$ on the inner face of the gear-wheel C, and, as is clearly shown in Fig. 1, the said flanges $b^5$ $c^5$ project inwardly toward each other over the shoe-receiving pockets and are of sufficient length to provide long bearing-surfaces for coöperating with the shoes $g'$ $g'$.

The inner extremities of the portions $b^5$ $c^5$ merge with the annular gear-rims $b^6$ $c^6$, respectively, which are of a proper pitch to mesh with the central or idler gear H, loosely mounted on the vertical shaft $h$, supported in a bracket I.

D designates a clutch-sleeve laterally shiftable on the central part $b$ of the sleeve or shaft extension A, and it has a central annular groove $d$ to receive the clutch-lever, (not shown,) of any approved construction, and which may be preferably arranged as shown in my copending application filed on even date with this application and which includes the general arrangement of the clutch mechanism shown in this application and certain details and modifications thereof not claimed in this application.

At the opposite ends the clutch-sleeve D has annular enlargements $d'$ $d'$, provided at diametrically opposite points with semicircular bearing-sockets $d^2$ $d^2$ to accommodate the circular heads $k$ $k$ of the adjustable toggles or clutch-links K K, which include an adjusting-nut $l$ and coupling-blocks $l'$, with which the screw-shanks of the heads $k$ engage. The blocks $l'$ also have shanks $l^2$ integral with the circular heads L L, arranged to engage the semicircular sockets $g^3$ $g^3$ in the inner face of the shoes $g'$.

By reason of the peculiar construction of the shoes and the pockets $f$ integral with the sleeve A the several parts—i. e., the sleeve A and the shoes $g$—can be economically made, and the necessity of providing a feather or key device to interlock the clutch D with the sleeve A, as is usually done, is avoided, as the said sleeve in my construction is merely utilized to shift the toggles to bring the oppositely-disposed brake-shoes alternately into a tight frictional engagement with the clutch-flanges $b^5$ $c^5$, the interlocking of the pulleys or gears B and C with the sleeve A, which is keyed to the shaft 1, being effected through the shoe-shank and the manner in which they engage the sleeve A.

From the foregoing description, taken in connection with the accompanying drawings, it is believed the manner in which my clutch mechanism operates and its advantages will be readily apparent to those skilled in the art to which it apertains.

Providing pockets on the sleeve A, as described and shown, which in the manufacture of the sleeve is readily done by means of metallic cores, leaves all of the pockets alike and finished when the sleeve is cast, which greatly diminishes the cost of making the sleeve and the shoe-pockets, and by reason of the peculiar shape of the pockets the shoes can be partly made in metallic flasks, and thereby initially made in such shape as to require very little hand-finishing to properly fit them in the pockets.

Having thus described my invention, what I claim, and desire to secure by Letters Patent, is—

1. A reversing clutch mechanism comprising a tubular sleeve adapted to be fixedly mounted on the end of a drive-shaft and having an independent bearing portion at each end and an intermediate bearing portion, a band-pulley loosely mounted on one of the end bearing portions of the sleeve provided with a clutch-flange and a gear-rim, a clutch-pulley mounted on the opposite bearing end of the sleeve and provided with a gear-rim facing the gear-rim on the band-pulley, an idler-gear meshing with the aforesaid gear-rims, means on the tubular sleeve for holding the band and gear pulleys from lateral movement on the intermediate bearing-surface of the tubular sleeve, radially-movable clutch-shoes carried by the tubular sleeve, and toggle connections joining the said shoes and the shifting clutch member, as set forth.

2. In a reversing clutch mechanism as described, the combination with a tubular sleeve adapted to be fixedly joined with a drive-shaft, a combined gear and drive pulley loosely mounted on one end thereof, a clutch-gear opposing the said band-pulley loosely mounted on the other end of the tubular sleeve, the said opposing gears each having a clutch-flange, radially-movable clutch-shoes for engaging the said clutch-flanges carried by the tubular sleeve and held in alinement with the clutch-flanges on the opposing gears, said shoes being fixedly held from lateral motion with respect to the sleeve, a sliding clutch member mounted on the tubular sleeve, and toggle devices connected with the opposite ends of the slidable clutch member and with the radially-adjustable clutch-shoes, for the purposes described.

3. In a clutch mechanism as described; the combination with the drive-shaft 1, the tubular sleeve fixedly mounted on and extended from the shaft, a combined clutch-drum and band-pulley loosely mounted on the sleeve at the shaft end, a gear-drum mounted on the opposite end of the sleeve, an idler-gear joining the two gear-faced drums, each of the said drums having a clutch-flange, pockets integrally formed with the sleeve and projected radially therefrom and arranged to engage the inner faces of the gear-drums, clutch-shoes held in the said pockets and having radial adjustment therein, said shoes including segmental flanges for engaging the clutch-flanges on the drums, a shiftable clutch-adjusting member mounted on the sleeve at a point between the shoe-pockets, and toggle devices connecting the opposite ends of said shiftable clutch member and the clutch-flanges of the shoes, substantially as shown and described.

4. In a reversing mechanism of the character described, a tubular sleeve adapted to be fixedly mounted on a drive-shaft having separate bearing portions, a pair of opposing gear-faced pulleys having clutch-flanges mounted on said bearing portions, said sleeve having integral radially-projected pockets, clutch-shoes, each consisting of a stem radially movable in the sleeve-pockets, a segmental clutch member for coacting with the clutch-flange of the opposing gear-faced drums, a shiftable clutch-adjusting member mounted on the sleeve between the shoe-pockets, and toggle devices connecting the opposite ends of the said clutch members, and the clutch-flanges of the shoes, as shown and described.

5. In a reversing clutch mechanism as described; a tubular sleeve adapted to be fixedly mounted on a drive-shaft, a pair of opposing gear-pulleys loosely mounted on the opposite ends of the sleeve, an idler-gear meshing with the said pulleys, radially-adjustable clutch-shoes, means for connecting the shoes with the tubular sleeve and holding them from lateral movement on the said sleeve, a clutch-adjuster slidable on the tubular sleeve, the aforesaid opposing pulleys each having a clutch-flange to coact with the clutch-faces of the shoes, and toggle members for connecting the slidable adjuster and the clutch-shoes for alternately moving said shoes into a clutching position, all being arranged substantially as shown and for the purposes described.

6. A reversing clutch mechanism comprising a tubular sleeve adapted to be fixedly mounted on the end of the drive-shaft, and having an independent bearing portion at each end and an intermediate bearing portion, a band-pulley loosely mounted on one of the bearing portions of the sleeve and provided with a clutch-flange and a gear-rim, a clutch-pulley mounted on the opposite bearing end of the sleeve and provided with a gear-rim facing the gear-rim on the band-pulley, an idler-gear meshing with the aforesaid gear-rims, means on the tubular sleeve for holding the band and gear pulleys from lateral movement on the tubular sleeve, said means including projections on the intermediate portion of the sleeve, and rings secured to the extreme portions of the sleeve, radially-movable clutch-shoes and a shifting clutch member carried by the tubular sleeve, and toggle connections joining the said shoes and the shifting clutch member.

7. In a clutch mechanism of the character stated, the combination with the drive-shaft 1, the tubular sleeve fixedly mounted on and extended from the shaft, a combined clutch-drum and band-pulley loosely mounted on the sleeve at the shaft end, a gear-drum mounted on the opposite end of the sleeve, an idler-gear joining the two gear-faced drums, each of the said drums having a clutch-flange, pockets integrally formed with the sleeve and projected radially therefrom and arranged to engage the inner faces of the gear-drums, clutch-shoes held in the said pockets and having radial adjustment therein, said shoes including segmental flanges for engaging the clutch-flanges on the drums, a shiftable clutch-adjusting member mounted on the sleeve at a point between the shoe-pockets, and toggle devices connecting the opposite ends of said shiftable member and the clutch-flanges of the shoes, said pockets serving to prevent lateral movement of the combined clutch-drum and band-pulley and the gear-drum toward each other, and rings removably secured to the sleeve adjacent each drum to turn with the sleeve and to prevent lateral movement of the said drums on the sleeve away from each other, for the purposes specified.

8. A reversing clutch mechanism comprising a tubular sleeve adapted to be fixedly mounted at one end on the end of the drive-shaft, a plug for closing the opposite end of the sleeve to form an oil-receiving chamber, said sleeve having an independent bearing portion at each end and an intermediate bearing portion, a band-pulley having a hub loosely mounted on one of the end bearing portions of the sleeve and provided with a clutch-flange and a gear-rim, a clutch-pulley having a hub mounted on the opposite bearing end of the sleeve and provided with a gear-rim facing the gear-rim of the pulley, an idler-gear meshing with the opposite gear-rims, means on the tubular sleeve for preventing lateral movement of the band and gear pulleys toward or away from each other, said means including projections on the sleeve at the juncture of the end bearing portions and the intermediate bearing portions, a pair of rings adjustably and removably mounted on the sleeve in engagement with the outer ends of the band and gear pulley hubs, said projections abutting the inner ends of the hubs, radially-movable clutch-shoes and a shifting clutch member carried by the tubular sleeve, and toggle connections joining the said shoes and the shifting clutch member, for the purposes specified.

WILLIAM JAMES WRIGHT.

Witnesses:
EDMUND J. EVANS,
C. V. BOYER.